May 29, 1956 A. W. EDWARDS ET AL 2,748,221

CIRCUIT INTERRUPTER OPERATING MECHANISM

Filed Sept. 12, 1950 6 Sheets-Sheet 1

INVENTORS
Andrew W. Edwards &
Alvin W. Ogg.
BY Arthur T. Stratton
ATTORNEY

CIRCUIT INTERRUPTER OPERATING MECHANISM

Filed Sept. 12, 1950 6 Sheets-Sheet 2

WITNESSES:
Robert C. Baird
Wm. C. Groome

INVENTORS
Andrew W. Edwards &
Alvin W. Ogg.
BY Arthur T. Stratton
ATTORNEY

CIRCUIT INTERRUPTER OPERATING MECHANISM

Filed Sept. 12, 1950 6 Sheets-Sheet 3

INVENTORS
Andrew W. Edwards &
Alvin W. Ogg.
BY Arthur T. Stratton
ATTORNEY

May 29, 1956 A. W. EDWARDS ET AL 2,748,221

CIRCUIT INTERRUPTER OPERATING MECHANISM

Filed Sept. 12, 1950 6 Sheets-Sheet 4

INVENTORS
Andrew W. Edwards &
Alvin W. Ogg.
BY Arthur T. Stratton
ATTORNEY

CIRCUIT INTERRUPTER OPERATING MECHANISM

Filed Sept. 12, 1950 6 Sheets-Sheet 5

WITNESSES:

Robert C. Baird

Wm. C. Groome

INVENTORS
Andrew W. Edwards &
Alvin W. Ogg.
BY Arthur T. Stratton
ATTORNEY

CIRCUIT INTERRUPTER OPERATING MECHANISM

Filed Sept. 12, 1950 6 Sheets-Sheet 6

INVENTORS
Andrew W. Edwards &
Alvin W. Ogg.
BY Arthur T. Stratton
ATTORNEY 2,748,221

CIRCUIT INTERRUPTER OPERATING MECHANISM

Andrew W. Edwards, East McKeesport, and Alvin W. Ogg, Pittsburgh, Pa., assignors to Westinghouse Electric Corporation, East Pittsburgh, Pa., a corporation of Pennsylvania Application September 12, 1950, Serial No. 184,482

13 Claims. (Cl. 200—89)

This invention relates generally to operating mechanisms for electric circuit interrupting devices, and, more particularly, to such a mechanism which is trip-free in character and is adapted for both manual and power operation of different types of circuit interrupting devices.

It is often desirable, particularly where circuit interrupting devices are installed at isolated points, to be able to operate them at will from a remote point as well as at the apparatus itself, and, of course, it is essential in such an arrangement that the circuit opening operator be controlling, or in other words that the contacts of the interrupting device be capable of tripping free of the closing means to open the circuit whenever called upon to do so irrespective of whether or not the circuit closing means is attempting a closing operation. Moreover, where the circuit interrupting device incorporates automatic circuit opening means, it is necessary that such means be correlated with the remote and/or manually operated means.

One object of this invention, therefore, is to provide novel operating mechanism for trip-free operation of electric circuit interrupting devices.

Another object of this invention is to provide novel operating mechanism for electric circuit interrupting devices for both remote and manual trip-free operation.

Still another object of this invention is to provide for an automatic-reclosing circuit interrupting device, novel trip-free operating mechanism therefor for operation from a remote point.

Another object of this invention is to provide for an automatic-reclosing circuit interrupting device which automatically locks itself in open circuit condition in response to a predetermined number of closely successive operations, trip-free operating mechanism therefor operable from a remote point and having novel cooperation with the lock-open mechanism of the device.

These and other objects of this invention will become more apparent upon consideration of preferred embodiments thereof described in the following specification and shown in the attached drawings, in which.

Figure 1:
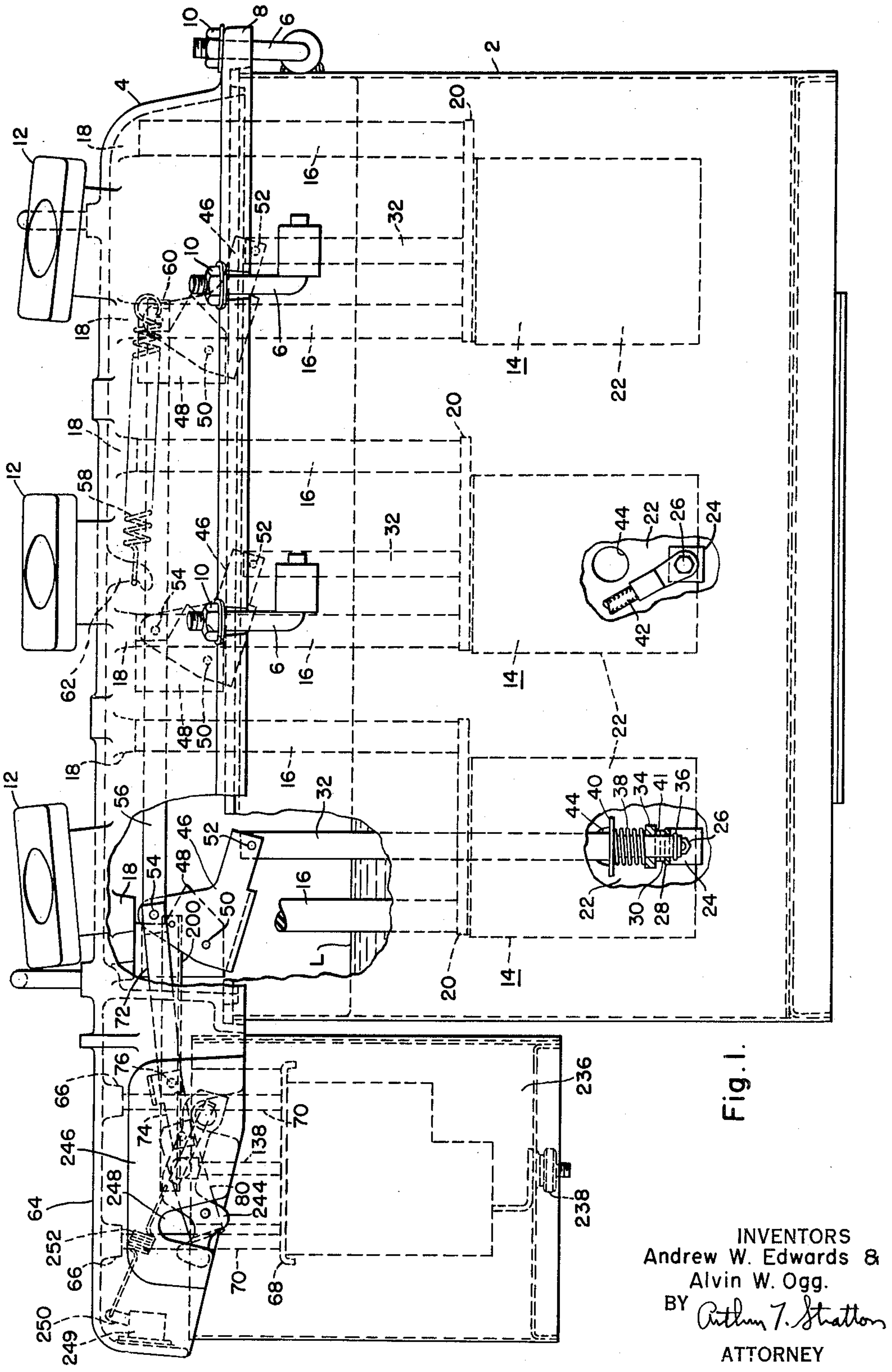
Figure 1 is a side elevation view, partly broken away, and with certain parts in section, illustrating a three-pole power operated circuit interrupting device constructed in accordance with one embodiment of this invention.

The circuit interrupting device shown in Figs. 1 to 8 is mounted in a metal tank 2 having an open top adapted to be closed by a hollow cover casting 4, which may be secured to the tank in any desired manner, for example as by bolts 6 secured to the tank and adapted to extend through openings in cover flange 8, to have nut 10 thereon for drawing the cover down tight on the upper edge of the tank.

The circuit interrupting device illustrated is shown as having three poles, with the cover having three spaced pairs of bushing supports 12 on which lead-in bushings for line conductors may be mounted. A switch unit 14 is provided for each pole, with these switch units each being supported from cover casting 4 by one or more supporting rods 16, preferably of an insulating material such as fiber or the like, which are secured to integral supporting lugs 18 inside the cover casting, and have a supporting plate 20 for the switch unit secured to their lower ends.

Each switch unit 14 includes a relatively large insulating tube 22 secured at its upper end to supporting plate 20 in any desired manner, with stationary contact supporting brackets 24 being secured at the lower end of each tube 22, at opposite sides thereof. Each contact bracket 24 is of substantially U-form to be slipped over the lower edge of tube 14 and secured thereon as by a bolt 26, and each bracket further includes a lateral contact supporting extension 28 inside tubes 22 on which a stationary contact tip 30 is secured.

A movable contact rod 32 is adapted to extend down through a substantially central opening in supporting plate 20 of each switch unit and it has a bridging contact bar 34 slidably mounted on the reduced lower end thereof which is biased toward a stop ring 36 mounted on the lower end of each contact rod by a coiled compression spring 38 mounted above bridging contact bar 34 on the movable contact rod 32, and reacting against a washer 40 seated on the shoulder formed by the reduced area lower end of movable contact rod 32. Contact tips 41 are provided at the outer ends of bridging contact bar 34 for engagement with contact tips 30 of the stationary contacts at the closed circuit position of the circuit interrupting device. The bolts 26 which secure the stationary contacts in position may be also employed to secure a line conductor 42 to each of the stationary contacts. It will also be noted that each of the tubes 22 for each switch unit has opposed side openings 44 immediately above each stationary contact.

The switch unit and contact mounting described above is similar to the unit more particularly described in the patent of J. M. Wallace et al., No. 2,686,854 which issued on August 17, 1954, on Circuit Interrupter, and assigned to the same assignee as this invention. Accordingly, for a more complete description of such a unit, reference is hereby made to the above-mentioned patent. In operation, when the movable contact rod 32 is moved upwardly to operate the contacts, the contact tips will eventually separate and if an arc is drawn, it is confined by the tube 22 of each switch unit with side openings 44 permitting transverse expulsion of gases generated by the arc. It will be noted that tank 2 is preferably filled with an arc extinguishing liquid, such as oil, up to the level L.

In order to operate movable contact rods 32, each is pivotally connected at its upper end with a bell crank lever 46 which is substantially U-shaped in cross section to receive a supporting bracket 48 and be pivotally mounted thereon as at 50, with the pivot connection of one arm of the bell crank 46 with movable contact rod 32 being at 52. The other arm of bell crank lever 46 is pivoted as at 54 with one end of an elongated link 56, which is similarly pivotally connected to the bell crank lever 46 of all of the switch units 14. Connecting link 56 thus couples the moving contacts 32 of the three switch units 14 for movement in unison, and it is biased for movement to the left as shown in Fig. 1 to cause opening of the contacts of the switch units by a coiled tension spring 58 anchored at one end to a lug 62 integral with tank cover 4, and at the other end anchored to an integral lug 60 on the outer end of connecting link 56.

The hollow cover 4 for tank 2 has an integral extension 64 at one end which extends outwardly beyond that end of the tank and has therein integral supporting lugs 66 for supporting a plate 68 at a position spaced beneath the cover, as by one or more supporting rods 70, for the supporting operating mechanism for the circuit interrupting device.

The operating mechanism includes toggle linkage mounted on top of supporting plate 68 comprising a toggle link 72 which is connected to the adjacent pivot 54 for the adjacent switch unit 14 at one end, and at its other end is connected to a second toggle link 74 which is of inverted U-shape at the end adjacent link 72, to form one overcenter pivot 76. Toggle link 74 has a bight portion 78 overlying the adjacent end of link 72 to limit relative movement of overcenter pivot 76 downwardly. A third toggle lever 80 also of U-shape has the legs thereof adjacent bight portion 86 mounted on a stationary pivot 82 on a stationary supporting bracket 88 also of substantial U-shape with its bight portion secured to the upper side of mechanism supporting plate 68. Toggle lever 80 is connected to link 74 by an overcenter pivot 84, so that the toggle linkage includes the two overcenter pivots 76 and 84.

Overcenter pivot 76 of the toggle linkage is adapted to be held against movement at the closed circuit position of the interrupting device by means of a toggle latch link 90 pivoted on the same axis as overcenter pivot 76 at one end, and at its other end having an overcenter latch pivot 92 with a second toggle latch link 94 which, in turn, is stationarily pivoted at 96 between the legs of bracket 88. It will be observed that at the closed circuit position of the parts illustrated in Figs. 3 and 5, overcenter pivot 76 is slightly above the center line between toggle pivots 84 and 54 so that spring 58 tends to break this toggle upwardly but this is prevented by a latch lever 98 having a latch shoulder 102 engaging a roller 100 provided on overcenter latch pivot 92, which prevents this pivot from moving to the left as viewed in Fig. 3, and consequently holds overcenter pivot 76 of the overcenter linkage from breaking upwardly. Latch lever 98 is mounted on a stationary pivot 104 at one end outside of bracket 88 with an inwardly directed part extending through an opening 97 in one side of bracket 88 to support shoulder 102 inside the bracket, and having at the opposite end a laterally extending portion 106, for a purpose to be described.

Figure 2:
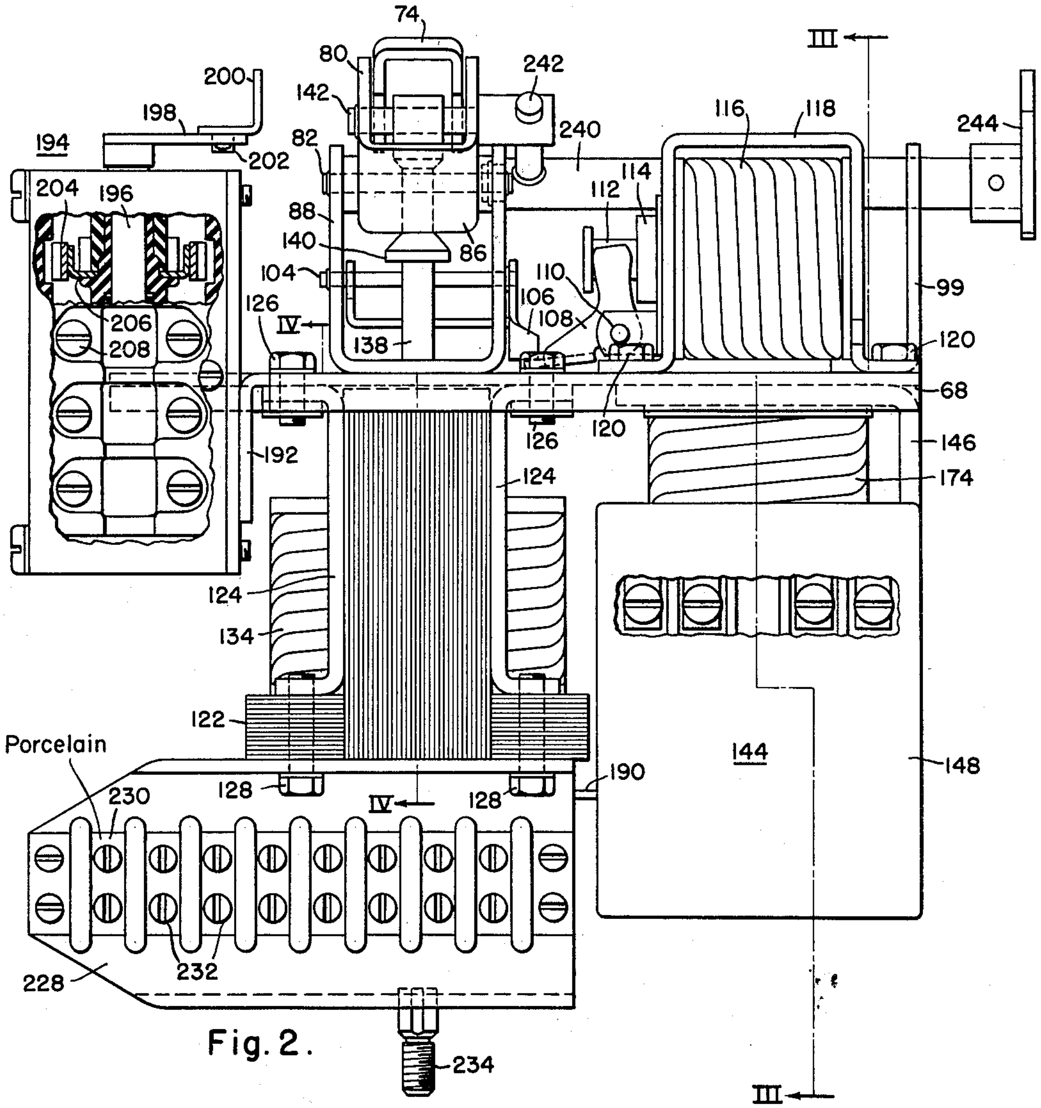
Fig. 2 is an enlarged end elevation view of the power operating mechanism shown in Fig. 1, with certain of the parts broken away and illustrated in section.

Referring to Fig. 2 of the drawings, it will be observed that extension 106 of latch lever 98 overlies one leg of a latch release bell crank 108 pivotally mounted on the supporting frame 118, at 110. The other end of latch release bell crank 108 is received in an annular groove 112 provided in the outer end of the core 114 of a trip coil 116, which is mounted within a supporting frame 118 of inverted U-form, and secured to mechanism supporting plate 68, as by the bolts 120.

A plate 122 of magnetic material, such as soft iron, is supported at a point spaced beneath mechanism supporting plate 68 by a pair of channel-shaped supporting plates 124, which may also be of magnetic material with the channel plates being secured to mechanism supporting plate 68 as by bolts 126, and supporting magnetic plate 122 as by bolts 128. Magnetic plate 122 is provided with a central opening 130, which lines up with the central opening in a closing coil 134 mounted in cutout parts 132 of channel supporting plates 124, with the former openings adapted to receive an armature 136 for closing coil 134, and the armature has an operating rod 138 projecting from the upper end thereof. Armature operating rod 138 has an integral stop flange 140 thereon positioned above mechanism supporting plate 68, and at its upper end is pivoted as on pivot pin 142 to toggle lever 80.

It will now be observed that in the closed position of the circuit interrupting device shown on the drawings, both overcenter pivot 76 and 84 of the toggle linkage are held at positions slightly above their central positions so that contact opening spring 58 tends to break both of these toggles upwardly, and both are held against such movement with overcenter pivot 76 being held by latch 98, and overcenter pivot 84 being held against further upward movement by engagement of armature 136 of the closing coil with a stop formed by coil supporting channel plates 124. Opening of the contacts can be accomplished from a remote location by causing energization of trip coil 116, which will attract its armature 114 inwardly to rotate latch release lever 98 in a clockwise direction (Fig. 2) to thus similarly rotate latch release lever 98 (Fig. 3), to release overcenter latch pivot 92 and permit the linkage to move from the position shown in Figs. 1 to 5 to that shown in Fig. 6 where overcenter pivot 76 breaks upwardly. After this has occurred, the biasing force of gravity on core 136 of the closing solenoid moves it and toggle link 80 downwardly, and the parts ultimately reach the position shown in Fig. 7 of the drawings where overcenter latch pivot 92 will again be latched by latch lever 98. The linkage now is in condition for closing the contacts of the circuit interrupting device from a remote point by causing energization of closing coil 134, which attracts its armature 136 upwardly forcing counterclockwise rotation of toggle link 80 (Fig. 7) to thus restore the linkage to the position shown in Figs. 1, 2, 3 and 5 with the contacts of the circuit interrupting device closed.

Figures 3, 4, 5, 6, 7:
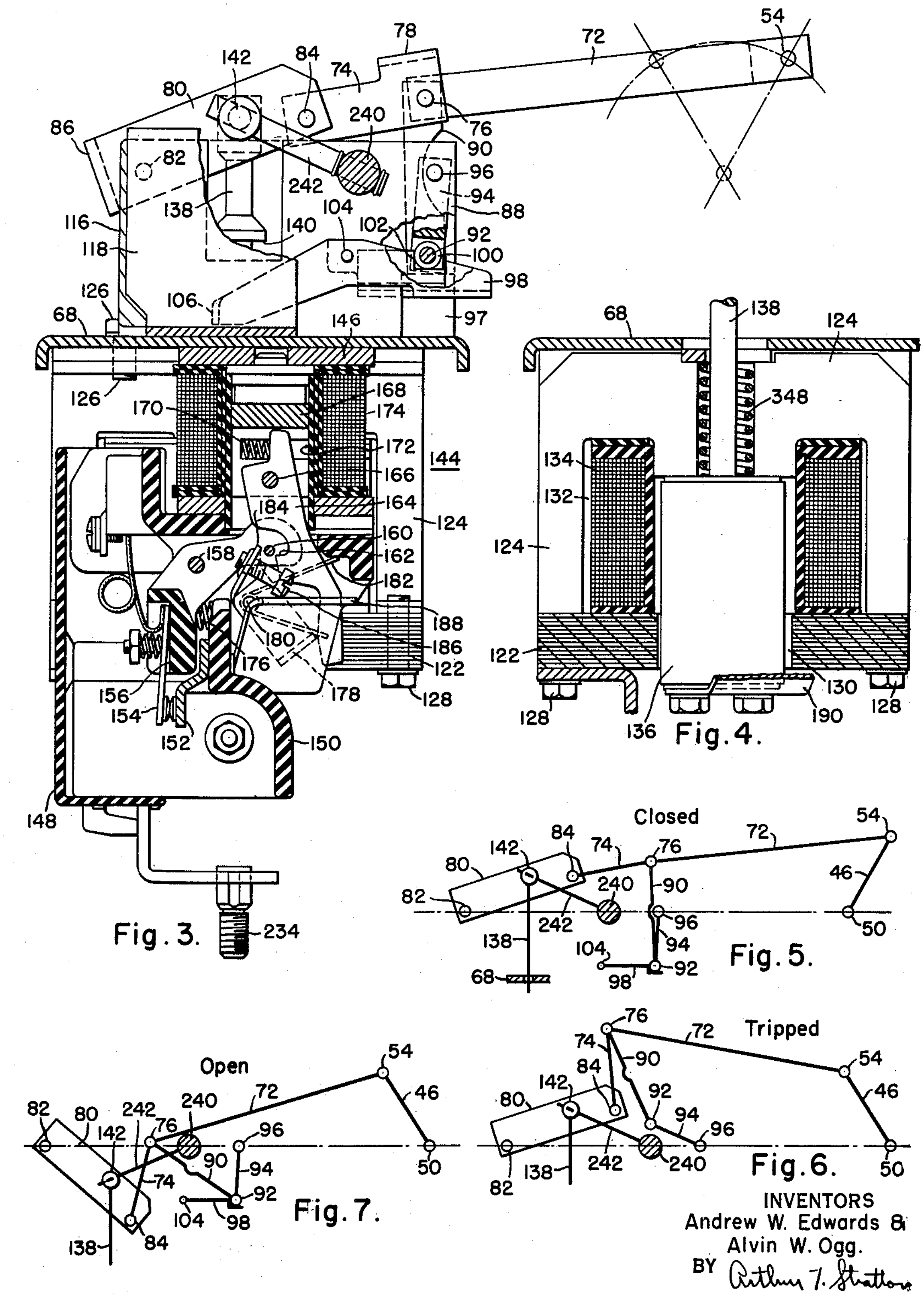
Fig. 3 is a cross section view of the power operating mechanism shown in Fig. 2, and taken substantially on the line III—III thereof.
Fig. 4 is a partial vertical section through the operating mechanism shown in Fig. 2, taken substantially on the line IV—IV thereof.
Fig. 5 is a diagrammatic view of a part of the operating mechanism shown in Figs. 1 to 4, illustrating the toggle linkage at the closed circuit position.
Fig. 6 is a view similar to Fig. 5, but illustrating the linkage at the position it occupies when the mechanism has been tripped to cause opening of the circuit interrupter.
Fig. 7 is a view similar to Figs. 5 and 6, but showing the linkage at the position it occupies when the interrupter is at an open circuit position preparatory to closing the interrupter contacts.

For the purpose of energizing closing coil 134, there is provided a relay 144 more particularly shown in Fig. 3 of the drawings, which is mounted on an integral annular mounting extension 146 of mechanism supporting plate 68. Relay 144 is mounted in a substantially U-shaped supporting frame 148 and this, in turn, supports frame structure 150 of insulating material, such as a molded insulating material, on which are mounted spaced stationary contacts 152 (only one of which is shown). These stationary contacts 152 are adapted to cooperate with movable contacts 154 mounted on one end of a contact lever 156, also preferably of a molded insulating material, pivotally mounted intermediate its ends at 158, and carrying at the other end thereof a transverse actuating pin 160. In closing the relay contacts 152 and 154, the actuating pin 160 of the contact lever is adapted to be engaged by the shoulder 162 on an operating link 164, which is pivotally mounted at 166 in a slot provided in the lower end of an armature 168 for relay coil 174. Operating link 164 of the relay is normally biased in a clockwise direction, as viewed in Fig. 3, to cause engagement of its shoulder 162 with actuating pin 160 of the contact lever 156, by a coil compression spring 170 mounted in the slot of relay armature 168, and reacting between it and the upper end of operating link 164. A guide sleeve 172 of insulating non-magnetic material is preferably provided in relay coil 174 for guiding reciprocating movement of armature 168. Movable contact lever 156 is biased for movement in a clockwise direction (Fig. 3) to disengage movable contacts 154 from stationary contacts 152. For the purpose of releasing operating link 164 from actuating pin 160 of the contact lever, there is provided a generally U-shaped release lever 178 pivotally mounted as at the outer ends of the arms thereof at 180, and normally biased in a clockwise direction (Fig. 3) away from operating link 164, by a spring 182. However, by reference to Figs. 3 and 4 of the drawings, it will be noticed that there is secured to the lower end of armature 136 of the closing coil, an angularly shaped extension 190 having an outer end 188 which extends into proximity with an angular extension 184 on release lever 178 so as to be engageable with an adjustable screw 186 in the extension 184 of the release lever to cause counterclockwise movement of release lever 178 so that its bight portion engages the lower end of operating link 164 to move its shoulder 162 out from beneath actuating pin 160 on the contact lever, to thus mechanically disconnect the relay armature 168 and movable contact lever 156 from operating link 164 when the solenoid core 136 attains its uppermost or closed circuit position, so that the relay contacts are then permitted to be opened by relay spring 176, irrespective of whether or not relay coil 174 is then energized.

At the position of the parts of the relay shown in Fig. 3 of the drawings, extension 190 from the core 136 of the closing solenoid has engaged adjustable screw 186 of release lever 178 and moved the later to remove shoulder 162 of operating link 164 from beneath actuating pin 160 on the contact lever 156, and the position of the parts is that where the relay contacts are still closed just prior to their opening movement under the influence of spring 176. Assuming the relay contacts to then open, if closing coil 134 and relay coil 174 are then both deenergized, armature 136 of the closing coil will descend under the influence of gravity as heretofore explained, thus permitting operating link 164 to rotate in a clockwise direction where it will be in a position to re-engage actuating pin 160 of the relay contact lever as soon as armature 168 of the relay coil descends a sufficient distance. Upon re-energization of relay coil 174 its armature will be drawn upwardly and the operating link will carry actuating pin 160 upwardly to close relay contacts 152 and 154. Then if closing coil 134 be re-energized, its armature 136 will be moved upwardly to close the contacts of the interrupting device as previously explained and ultimately its engagement with screw 186 on release lever 178 will cause operating link 164 to be moved out from under actuating pin 160 and thus mechanically release the relay contacts for opening movement when the closing solenoid has completed its travel and the contacts of the interrupting device are closed.

At the left as viewed in Fig. 2, mechanism supporting plate 68 has a downwardly angled integral extension 192 on which is mounted a limit switch 194. This switch has an operating shaft 196 provided with an operating crank 198 at its outer end which is pivotally connected as at 202 with a link 200 connected at its other end to the adjacent pivot 54 of the operating linkage. Limit switch 194 includes a plurality of sets of stationary contacts 204 spaced along the length thereof and adapted to cooperate with bridging contacts 206 to connect the circuit between each set of stationary contacts 204 dependent upon the position of the contacts of the circuit interrupting device. Each of the stationary contacts 204 of the limit switch has a terminal 208 at the exterior for connection of the various circuits thereto include indicator lighting circuits, for indication of the condition of the circuit interrupting device at a remote location.

Figure 8:
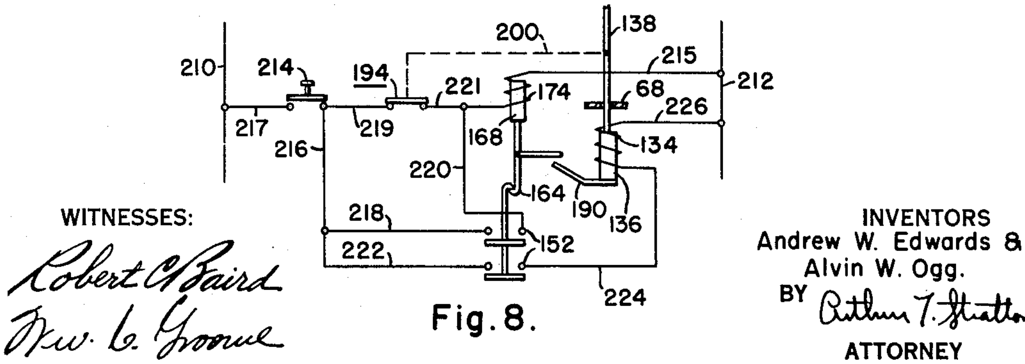
Fig. 8 is a diagrammatic view of the electric circuit for energizing the closing coil of the circuit interrupter.

The circuit for energizing closing coil 134 is diagrammatically shown in Fig. 8 of the drawings which illustrates a pair of conductors 210 and 212 representing a source of electrical energy, with conductor 210 being connected to a push-button switch 214 which may be located at a remote point, as by a conductor 217. The push-button switch 214 is connected in series circuit relation by a conductor 219 with one set of contacts of limit switch 194, and by conductor 221 with relay coil 174, and the series circuit to supply conductor 212 is then completed by conductor 215. Accordingly depressing push-button switch 214 to close its contacts will energize relay coil 174 because at the open circuit position of the circuit interrupter device the contacts of limit switch 194 which are in the series circuit described, will be closed. Thereupon, armature 168 of relay coil 174 will be attracted upwardly to close both of its sets of stationary contacts 152, to thus establish a circuit by way of conductors 216 and 218 through the upper set of relay contacts 152 and conductor 220 which bypasses limit switch 194 to thus maintain the relay coil energized irrespective of the position of the limit switch. A second circuit is established by the bridging of lower relay contacts 152 which includes a conductor 222 and a conductor 224 to closing coil 134, and conductor 226 to supply conductor 212. This circuit thus energizes closing coil 134 which attracts its core 136 upwardly to close the contacts, at which time release member 190 on core 136 of the closing coil causes operating link 164 of the relay to become mechanically disengaged from the movable contacts of the relay and permits these to open their circuits, thus deenergizing the relay coil 174 and closing coil 134. The particular circuit for energizing closing coil 134 described above also prevents pumping of the contacts of the circuit interrupting device in the event pushbutton 214 is held closed along with the switch controlling energization of trip coil 116 because operating link 164 of the relay will be held at a mechanically released position from the relay contacts when the contacts are closed and even after tripping, for example, when the parts are in the position shown in Fig. 6 where the interrupter contacts are open and limit switch 194 is closed. Accordingly, if closing push button 214 is held depressed, core 168 of relay coil 174 will never reset to pick up its contacts and thus can never cause closing of the interrupting device until push button 214 is released long enough for relay core 168 to reset.

A channeled supporting plate 228 is secured to the lower side of magnetic plate 122 of the operating mechanism as by bolts 128 and it, in turn, supports a terminal block 230 of insulating material, such as porcelain, having a plurality of terminal screws 232 thereon to which the various connections to the electrically energizable components of the operating mechanism may be made. The channel support 228 for the terminal block also is provided with a screw threaded stud 234 projecting downwardly to be received in an opening in the bottom wall of a casing 236 for the operating mechanism and then have a nut 238 threaded thereon to hold the casing 236 in a position where it receives the operating mechanism and forms a substantially complete enclosure therefor with cover 4 for tank 2.

In order to manually operate the circuit interrupting device, an operating shaft 240 is journalled in supporting plates 97 and 99 on mechanism supporting plate 68 and it has a radially projecting pin 242 slidably received in an opening provided in pivot pin 142 of toggle link 80. Operating shaft 240 extends beyond the operating mechanism to have an operating handle 244 secured thereon which is normally positioned (Fig. 1) beneath an offset hood portion 246 provided integral with one side of tank cover 4, and having a notch 248 therein through which the outer end of the handle is accessible for operation, as by a hook-stick operating member or the like.

Assuming the parts of the operating mechanism and circuit interrupting device to be at the closed circuit position illustrated, it will be apparent that by pulling downwardly on handle 244, the operating shaft 240 will be rotated in a direction such that its operating pin 242 causes toggle link 80 to move downwardly thus moving overcenter pivot 80 downwardly and over its center to the position where the toggle linkage is disposed as illustrated in Fig. 7 of the drawings, and at which position the circuit interrupting device is held at open circuit position by spring 58 mounted in cover 4. At this time, handle 244 will project beneath cover hood 246, and it will be apparent that by moving this back up to the position shown in Fig. 1, toggle link 80 will be moved back upwardly to move overcenter pivot 84 upwardly overcenter to the position shown in Figs. 3 and 5 where it is held by engagement of core 136 of the closing coil with shoulders formed on channel supporting plates 124, with the contacts of the circuit interrupting device thus being held at their closed circuit position.

If desired, a device 249 (Fig. 1) for registering the number of operations of the circuit interrupting device may be mounted within the lateral extension of cover 4 at the outer end thereof, and with an opening provided in the cover so that the register may be read from the exterior. The operating crank 250 of the register may be coupled by a spring connection 252 with link 200, to thus register the number of times the circuit interrupting device has been operated, inasmuch as the link 200 will be operated each time the contacts are operated since it must move with crank lever 46, and, of course, the latter operates on each operation of the circuit interrupting device as previously explained.

Figure 9:
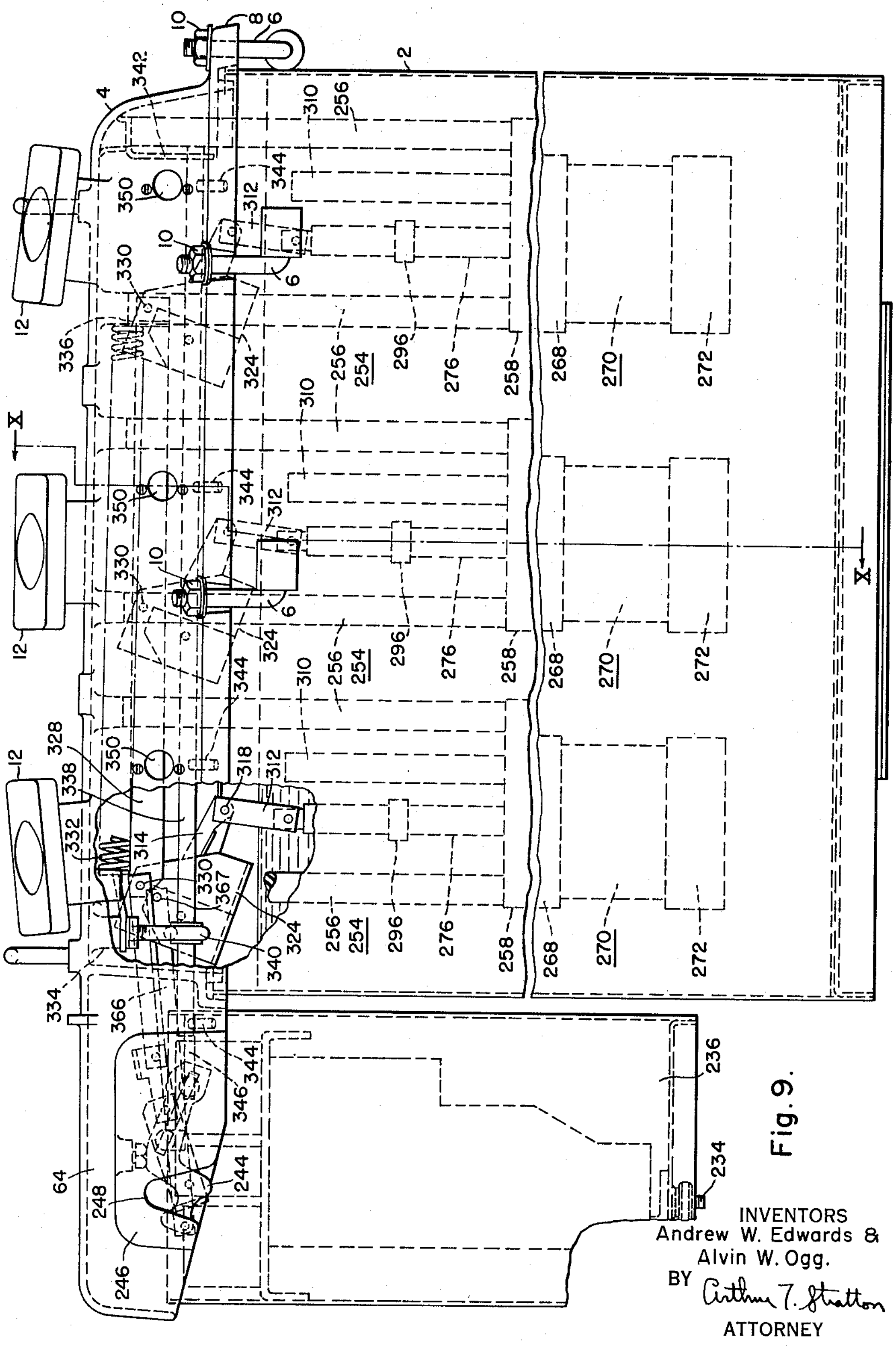
Fig. 9 is an elevation view similar to Fig. 1, but illustrating a modified form of the invention, particularly as applied to an automatic reclosing type of circuit interrupter.
Figure 10:
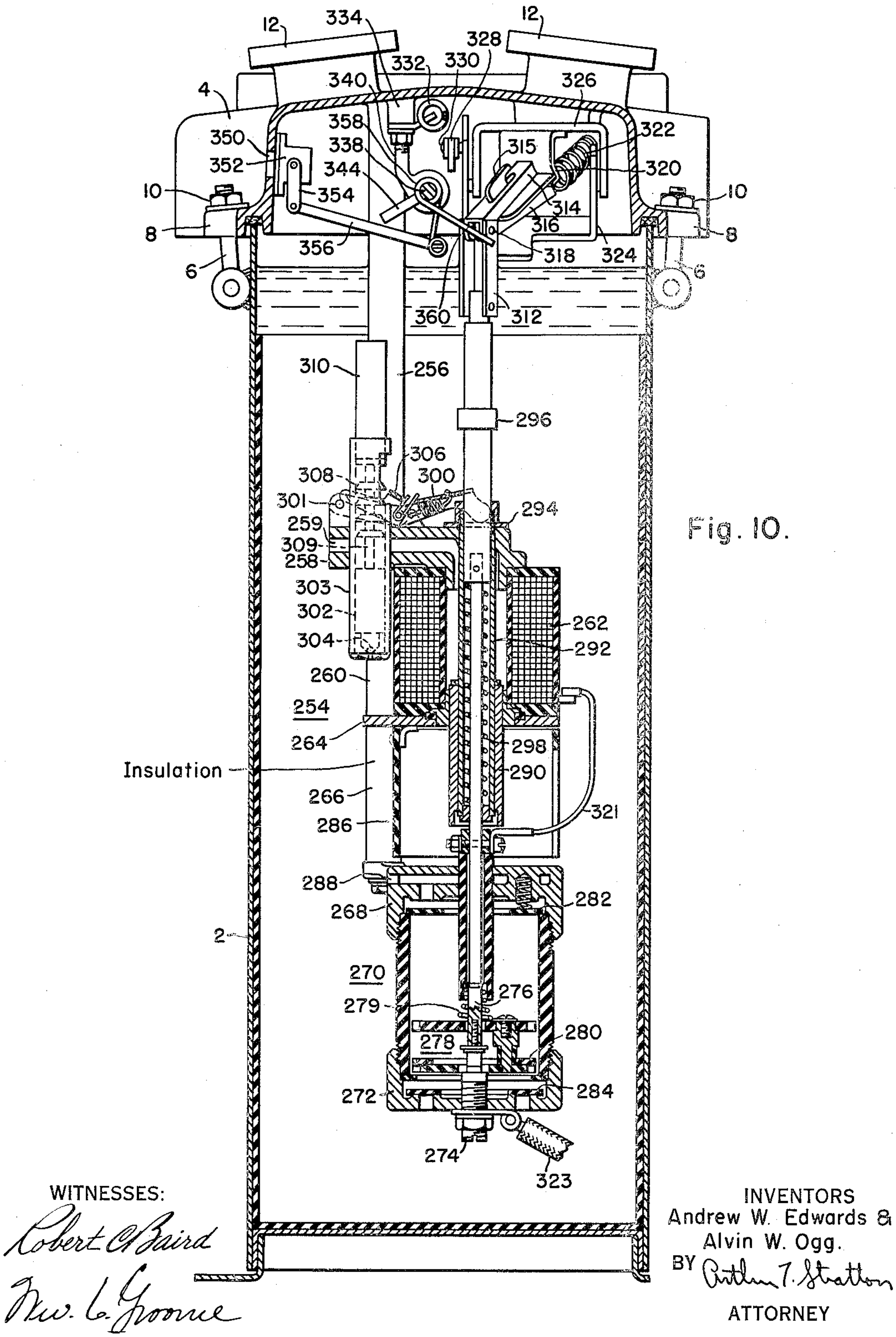
Fig. 10 is a transverse section of the interrupter shown in Fig. 9 illustrating one of the automatic reclosing units, and taken substantially on the line X—X of Fig. 9.
Figures 11, 12:
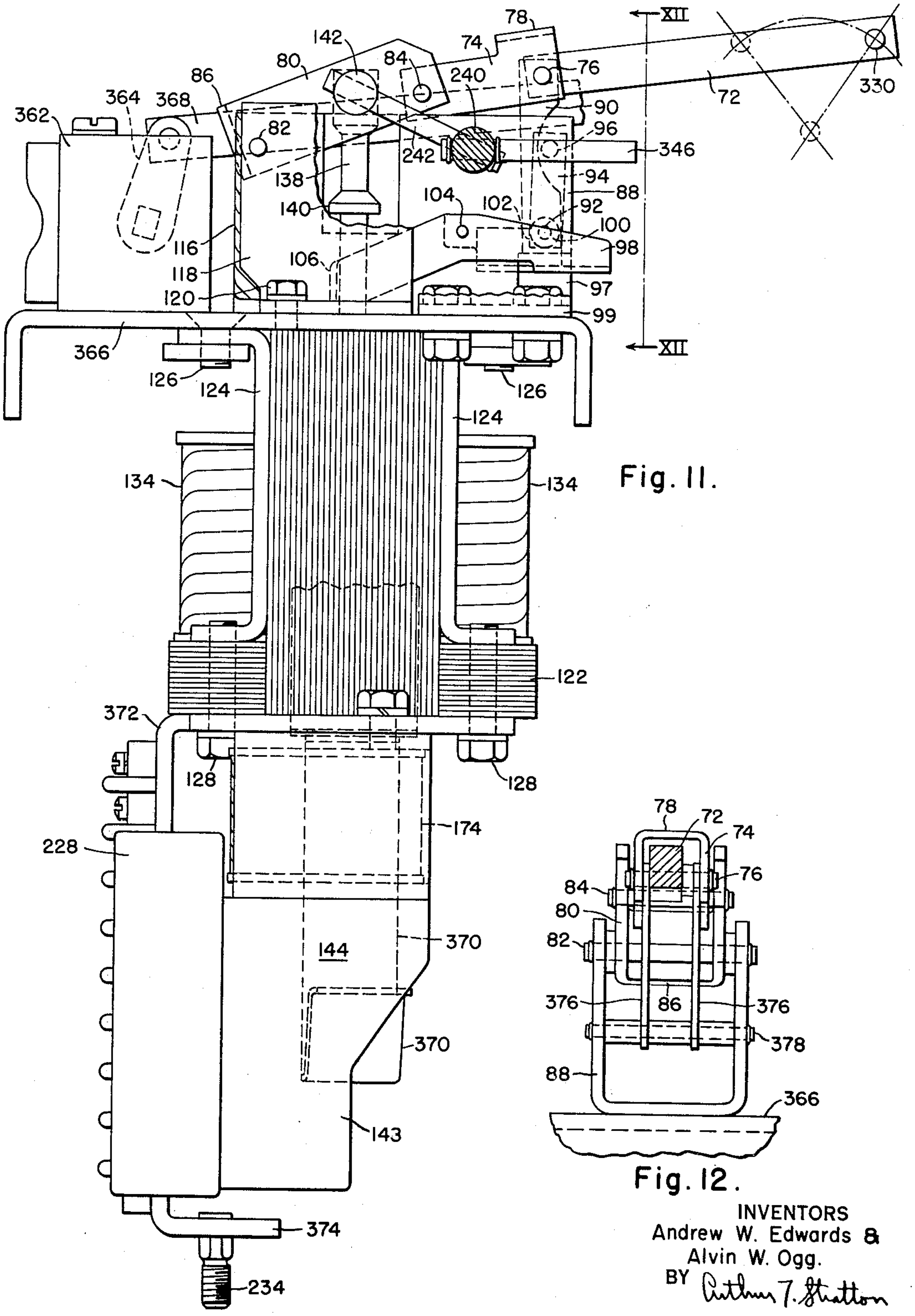
Fig. 11 is an enlarged elevation view of the power operating mechanism for the interrupting device shown in Figs. 9 and 10.
Fig. 12 is an end view of a modified form of operating mechanism taken substantially from the position shown by line XII—XII in Fig. 11.

The modification of the invention illustrated in Figs. 9 to 11 of the drawings employs many parts which are identical with those in the embodiment of the invention previously described, and accordingly, such like parts bear the same reference numerals in these figures of the drawings, and a detailed description thereof will not be repeated. The modification of Figs. 9 to 11 employs, instead of the switching units 14, units 254 which are of themselves capable of automatically opening and closing the circuit. Each of these automatic reclosing units 254 is supported from cover 4 by supporting rods 256 which are directly secured to a casting 258 at their lower ends. Additional supporting rods 260 are for the purpose of supporting a series operating coil 262 between casting 258 and a supporting plate 264 spaced beneath the casting, and still further supporting rods 266 are for the purpose of supporting at their lower ends the top cap 268 of an arc chamber 270 from supporting plate 264. The supporting rods are similar to those described in the embodiment of invention shown in Figs. 1 to 8 being preferably of an insulating material as previously described. Arc chamber 270 includes a tube of insulating material, such as fiber, threaded into top cap 268, and having a bottom cap 272 threaded on the lower end thereof. A stationary contact screw 274 is threaded into a center opening provided in bottom cap 272 of the arc chamber, and it is adapted to be engaged within the chamber by the lower end of a movable contact rod 276 having a liquid directing structure 278 slidably mounted thereon within the arc chamber. Liquid directing structure 278 has lost motion relative to the contact and is biased downwardly by a spring 279 and further includes a check valve ring 280 providing for freer movement of the movable contact rod and liquid directing structure downwardly then in an upward direction, and the arc chamber itself is provided with an outlet valve ring 282 spring biased to normally uncover outlet passage 288 in the top cap 268, and an inlet check valve ring 284 controlling inlet openings in bottom cap 272.

A tubular gas shield 286 of insulating material, such as fiber, is supported between top cap 268 of the arc chamber and supporting plate 264 for the bottom of series coil 262, being secured to plate 264, to prevent gases escaping from outlet 288 of the arc chamber from access to the central part of the casing in the vicinity of contact rod 276. A tubular solenoid core 290 is slidably mounted within series coil 262 and telescopically on contact rod 276, with an actuating tube 292 projecting upwardly therefrom to have an actuating washer 294 secured thereon at the top of casting 258, and being engageable with an integral shoulder 296 provided on the upper part of contact rod 276. A coil compression spring 298 is interposed between solenoid core 290 and a shoulder adjacent the upper end of contact rod 276 to be compressed as the core is attracted upwardly by coil 262.

In order to count the number of closely successive interrupting operations of the interrupting device, an actuating lever 300 is pivotally mounted on casting 258 as at 301, with its outer end resting on actuating washer 294, for advancing a counting piston 302 mounted in a vertical counting cylinder 303 having a liquid inlet in the bottom thereof controlled by a check valve 304, by means of a pawl portion 306 on the actuating lever which is engageable with ratchet teeth 308 formed on the rod 309 which extends upwardly from piston 302. At the upper end of piston rod 309, there is provided an operating rod 310 for a purpose to be described.

The upper end of contact rod 276 of each operating unit is pivoted to a pair of connecting links 312 which, in turn, are pivoted on a common pivot 313 to adjacent ends of a channel-shaped link 314, and a link 316 which has a hook portion 315 extending through an opening in the channeled link 314. The other end of channeled link 314 is pivoted in pivot depressions formed in the lower end of a pivot supporting bracket 320 secured to a lug integral with tank 4, and the two links 314 and 316 are held at the position shown by a coiled tension spring 322 engaged between a lug integral with tank cover 4 and link 316 to thus not only maintain the links in the position shown in Fig. 10, but also to exert substantial pressure on the contacts at the closed circuit position.

In operation, each automatic reclosing unit 254 being structurally substantially identical with the unit disclosed in the patent of J. M. Wallace et al. No. 2,647,184 which issued on July 28, 1953, assigned to the same assignee as this invention, will operate in substantially the same manner as the units in such patent. Accordingly, for a more complete description of the parts of each unit 254 and the mode of operation, reference is hereby made to the aforesaid patent.

In general, operating coils 262 being connected in series in the respective phase conductors by a conductor (not shown) leading to one of the bushings on cover 4 and conductor 321 connecting each coil to its contact rod 276, and thence by a conductor 323 to the other bushing mounted on tank cover 4, each coil will operate to attract its solenoid core 290 on overcurrents in its circuit conductor and after compressing spring 298 during upward movement, the core will eventually cause the upper end of its tube 292 to engage shoulder 296 on the contact rod to separate the movable contact from stationary contact screw 274, and thus draw an arc in arc chamber 270. The arc thus drawn will be acted on by liquid directed through the arc by the liquid directing structure 278 which is picked up by the movable contact rod in its upward movement. The pressure existing within the arc chamber during arcing operates to seal off the inlet and outlet valves 284 and 282, respectively, and also acts to accelerate opening movement of the contact rod. Likewise upward movement of actuating sleeve 292 advances counting piston 302 a predetermined amount. As soon as the arc within arc chamber 270 is extinguished, the movable contact rod is free to return due to the force of gravity, and possibly some force due to spring 322, to thus automatically reclose the circuit through each unit. In doing so, the arc chamber 270 may be flushed out by gases escaping through the top cap 268 being replaced by fresh liquid entering the inlet openings in the bottom cap 272. In the event of continuing overload, operation of the unit continues with counting piston 302 being moved forward a further amount each time, and the counting piston may also control outlet passage 259 in casting 258 for fluid displacement by the armature 290 during its upward movement so that initial circuit opening operations will be substantially unaffected and will occur substantially instantaneously, but when the piston arrives at the passage 259, it will obstruct it to thus slow down subsequent circuit opening operations occurring in close succession thereafter, due to the dashpot action of core 290. Of course, if the overload is not a continuing one, counting piston 302 will slowly reset by the displacement of liquid trapped beneath the same when it was advanced through the small clearance between the piston 302 and cylinder 303, so that if a continuing overload appears on the circuit at a later time, it will again operate to count only closely successive circuit opening operations.

In the automatic circuit opening and closing operations described above, each unit 254 is operable independently of the other, so that if the overload occurs on only one phase, only the unit 254 located in that phase conductor will operate, with the other units remaining closed.

A generally U-shaped bracket 324 has its leg portions pivotally mounted on the leg portions of an inverted U-shaped supporting bracket 326 having the bight portion of the latter secured to an integral supporting lug in cover 4 for tank 2, there being such brackets for each of the automatic reclosing units 254, with the bight portion of each bracket 324 being positioned beneath links 314 and 316 connected to the upper end of the contact rod 276 of the respective units. One leg of each bracket 324 has pivotally connected therewith as at 330, a connecting rod 328 which is common to all of the units, having the bracket 324 of each unit pivotally connected thereto. Connecting rod 328 is biased to the left as viewed in Fig. 9 in a direction to rotate brackets 324 counterclockwise to bring their bight portions into engagement with their respective links 316 to raise the contact rods 276 and hold them at an open circuit position, by a coil tension spring 332, having one end secured to a lug 334 integral with cover 4, and having the other end secured to an angled end 336 of connecting rod 328. However, connecting rod 328 is normally locked against movement by the operating mechanism, since the inner end of the connecting rod is pivotally connected to toggle link 72 as at the pivot point 330.

Also common to all of the automatic reclosing units 254 is a trip shaft 338 which extends in proximity to the upper ends of all of the units being rotatably supported at its inner end in a bearing bracket 340 suspended from the cover 4, and at its outer end in a bearing bracket 342 also supported from the cover. Trip shaft 338 is provided with a plurality of radially extending cranks 344, there being one for each automatic reclosing unit 254, and an additional one located within container 236 for the operating mechanism, and further located beneath a radially extending crank 346 from operating shaft 240.

As previously described, the counting piston 302 of each automatic reclosing unit 254 may, on sustained overload in that particular phase of the circuit, be advanced upwardly until after a predetermined number of closely successive operations the operating extension 310 thereof engages the radial crank 344 on trip shaft 338 located immediately thereabove, to rotate the trip shaft and thus cause the inner radial crank 344 to rotate operating shaft 240 in a direction to move toggle lever 80 downwardly and overcenter pivot 84 downwardly overcenter, to thus release tension spring 332 to move connecting rod 328 to the left. Such movement of connecting rod 328 carries with it each of the brackets 324, causing each bracket to lift the movable contact rod of its unit 254 and thus open the contacts of all of the units and hold them open. Also, as in the first described embodiment of this invention, the contacts of all units 254 may be opened from a remote location by energization of trip coil 116, which releases overcenter pivot 76 for movement upwardly, and this also releases spring 332 and permits it to open the contacts of all units 254, as previously described. Also the contacts of all units 254 may be manually opened and closed by movement of handle 244 in opposite directions, as previously described, because this will move overcenter pivot 84 of the linkage overcenter in opposite directions to either release spring 332, or prevent operation thereof. Furthermore, when the contacts of all units 254 have been opened by either manual, power, or automatic operation, they may be closed by energization of closing coil 134 from a remote point which operates to reset toggle lever 80 and overcenter pivot point 84 to the position shown in Figs. 9 and 11.

Since in this embodiment of the invention, the power transmitted from the counting pistons of any of the units 254 through trip shaft 338 for moving toggle lever 80 downwardly to move pivot 84 overcenter is relatively small, it may be desirable to provide a spring load for assisting such movement of toggle lever 80, and this may be conveniently done by providing a coil compression spring 348 (Fig. 4) which is compressed by closing movement of core 136 of the closing solenoid coil, with the force exerted by this spring at the closed circuit position being less than that required to move toggle lever 80 downwardly to move pivot 84 overcenter; and it will be obvious that the force required to be delivered from the counting means of any of the units 254 will be correspondingly decreased. In addition, spring 348 acts as a buffer or cushion for termination of closing movement of core 136 of the closing coil.

If desired, the cover 4 for tank 2 may be provided with an opening 350 in the side thereof adjacent each of the interrupting units for exposure of a register 352. The operating crank 354 of each register is connected by a pivoted link 356 to one end of a spring 358 coiled about trip shaft 338, with the other end of this spring lying under an end of a spring 360 coiled on pivot 318 of the links connected to the upper end of the movable contact rod 276 of each unit 254, so that the register will be operated on each operation of the contacts of its respective unit.

The operating mechanism for the embodiment of the invention shown in Figs. 9, 10 and 11 is substantially identical with that described in connection with the first embodiment of the invention, except that the several parts are arranged somewhat differently. Thus, limit switch 362 is mounted horizontally instead of vertically, as shown in Fig. 2, being supported on a mechanism supporting plate 366 which is suspended from the cover extension 64 in exactly the same manner as mechanism supporting plate 68 of the first embodiment of the invention. The operating crank 364 for limit switch 362 is connected by a pivoted link 368 to the adjacent bracket 324, by a pivot 367.

Also, instead of mounting relay 144 on top of the mechanism supporting plate, it is mounted beneath the closing solenoid, and the release member 370 attached to the lower end of the closing solenoid core extends downwardly to engage the mechanical release for the relay contacts. Also, the terminal base 228 is mounted vertically in this embodiment of the invention instead of horizontally, as shown in Fig. 2, being supported on a supporting plate 372 secured to magnetic plate 122 of the closing solenoid by bolts 128. The lower end of supporting plate 372 has an angularly directed end 374 to which is secured the threaded stud 234 for securing the casing for the mechanism in position.

If desired, the power operating mechanism may be omitted leaving the circuit interrupting device illustrated in Figs. 1 to 8 as a mere manually operated device, and that shown in Figs. 9 to 11 as a manually operated device for all poles with automatic reclosing operation of the pole units 254 capable of independent operation with automatic operation to lock open the contacts of all poles when any one of them automatically opens and closes the circuit a predetermined number of times in close succession. This conversion may be relatively simply done as illustrated in Fig. 12 of the drawings by merely substituting for the toggle latch links 90 and 94 of the operating mechanism a single pair of links 376 pivoted at their upper ends to overcenter pivot 76 and at their lower ends to a fixed pivot 378. This effectively prevents pivot 76 from going overcenter and converts the toggle linkage to one having but a single overcenter pivot 84.

In general, the power operation of both embodiments of the invention is essentially the same, and both have a novel arrangement of circuit interrupting device, particularly a multipole device, with the power operating mechanism, which in itself is of a particular trip-free character arranged for non-pumping of the contacts of the circuit interrupting device and may be power operated to both open and close the contacts of the circuit interrupting device. Having, therefore, described preferred embodiments of the invention in accordance with the Patent Statutes, it is desired that the invention be not limited to these particular constructions inasmuch as it will be obvious particularly to those skilled in the art that many modifications and changes may be made therein without departing from the broad scope and spirit of the invention. Accordingly, it is desired that the invention be interpreted as broadly as possible, and that it be limited only as required by the prior art.

We claim as our invention:

1. A circuit interrupter comprising, separable contacts, operating mechanism for said contacts including a longitudinally movable contact rod, a longitudinally movable lockout member normally biased to separate said contacts and a toggle linkage connected with and normally preventing movement of said member and having two overcenter pivots, releasable latch means cooperating with one of said overcenter pivots for holding the toggle associated therewith extended when said contacts are closed, stop means for holding the toggle associated with the other overcenter pivot at an extended position when said contacts are closed, and operating means connected to one lever of the toggle associated with said other overcenter pivot to move that lever overcenter in both directions for selectively moving the lockout member and opening and closing the contacts.

2. A circuit interrupter comprising, separable contacts, operating mechanism for said contacts, including a toggle linkage having two overcenter pivots, releasable latch means cooperating with one of said overcenter pivots for holding the toggle associated therewith extended when said contacts are closed, stop means for holding the toggle associated with the other overcenter pivot at an extended position when said contacts are closed, operating means connected to one lever of the second mentioned toggle to move the lever overcenter in both directions for selectively opening and closing the contacts, comprising power operating means to move said second pivot overcenter in a direction to close said contacts, said power operating means being biased to move said second pivot means overcenter in the other direction with a force insufficient to do so when the contacts are closed, but being effective to do so upon release of said latch means, and relay means operable to control energization of the power operating means in accordance with the position of the power operating means.

3. A circuit interrupter comprising, separable contacts, operating mechanism for said contacts, including a toggle linkage having two overcenter pivots, releasable latch means cooperating with one of said overcenter pivots for holding the toggle associated therewith extended when said contacts are closed, stop means for holding the toggle associated with the other overcenter pivot at an extended position when said contacts are closed, operating means connected to one lever of the second mentioned toggle to move the lever overcenter in both directions for selectively opening and closing the contacts, comprising power operating means to move said second pivot overcenter in a direction to close said contacts, and manual operating means mounted on a separate pivot and connected to the same toggle lever as said power operating means.

4. A circuit interrupter comprising, separable contacts, operating mechanism for said contacts, including a toggle linkage having two overcenter pivots, releasable latch means cooperating with one of said overcenter pivots for holding the toggle associated therewith extended when said contacts are closed, stop means for holding the toggle associated with the other overcenter pivot at an extended position when said contacts are closed, operating means connected to one lever of the second mentioned toggle to move the lever overcenter in both directions for selectively opening and closing the contacts, comprising power operating means to move said second pivot overcenter in a direction to close said contacts, said power operating means being biased by a spring which is stressed during a circuit closing operation of said power operating means to move said second pivot means overcenter in the other direction with a force insufficient to do so when the contacts are closed, but being effective to do so upon release of said latch means, and means including a relay operable to effect energization of said power operating means, in accordance with the operating position of the power operating means.

5. A circuit interrupter comprising, separable contacts, operating mechanism for said contacts, including a toggle linkage having two overcenter pivots, releasable latch means cooperating with one of said overcenter pivots for holding the toggle associated therewith extended when said contacts are closed, stop means for holding the toggle associated with the other overcenter pivot at an extended position when said contacts are closed, operating means connected to one lever of the second mentioned toggle to move that lever overcenter in both directions for selectively opening and closing the contacts, said operating means including a solenoid having its core connected with said one toggle lever, means for energizing the coil of said solenoid to close said contacts comprising, a limit switch and a relay having an operating coil and contacts, said relay contacts being in series circuit connection with said solenoid coil and limit switch, means mechanically connecting said limit switch and said separable contacts, a releasable connection between the armature of said relay and its contacts, and means actuated by the core of the operating solenoid to release said releasable connection.

6. A circuit interrupter comprising, separable contacts, operating mechanism for said contacts comprising toggle linkage having two overcenter pivots adapted to hold said contacts closed when said linkage is extended and both of said pivots are held at the same overcenter position at the same side of their central positions, separate means at the other side of the central pivot positions for holding the pivots at their aforesaid extended toggle positions, one of said holding means being releasable to release its pivot and toggle for breaking movement away from said holding means, the other of said holding means comprising a stop for an operating member which is connected to one lever of the toggle having said other holding means, power operated means for moving said operating member in a direction to move its associated toggle overcenter to its aforesaid extended position, and manually operable means for moving said operating member in opposite directions to move its associated toggle overcenter in both directions.

7. A circuit interrupter comprising, separable contacts, operating mechanism for said contacts comprising toggle linkage having two overcenter pivots adapted to hold said contacts closed when said linkage is extended generally horizontally and both of said pivots are held at the same overcenter position above their central positions, separate means below the central pivot positions for holding the pivots at their aforesaid extended toggle positions, one of said holding means being releasable to release its pivot and toggle for breaking movement away from said holding means, the other of said holding means comprising a stop for a vertically movable operating member which is connected to one lever of the toggle having said other holding means, power operated means for moving said operating member upwardly to move its associated toggle overcenter to its aforesaid extended position, whereby upon release of said one holding means said operating member biases and moves its toggle to a lower overcenter position to reset said releasable holding means.

8. An automatic reclosing circuit interrupter comprising, separable contacts, means responsive to overloads in the circuit to separate said contacts, means for automatically closing said contacts in response to a circuit opening operation thereof, lockout spring means biased to separate said contacts and hold them separated to prevent automatic closing thereof, a toggle linkage connected to said lockout means comprising two overcenter pivots, releasable latch means cooperating with one of said overcenter pivots for holding the toggle associated therewith extended when said contacts are closed to hold said lockout spring against operation, stop means for holding the toggle associated with the other overcenter pivot at an extended position when said contacts are closed to hold said lockout spring against operation, and operating means connected to one lever of the second mentioned toggle to move the lever overcenter in both directions for selectively opening and closing the contacts.

9. An automatic reclosing circuit interrupter comprising, separable contacts, means responsive to overloads in the circuit to separate said contacts, means for automatically closing said contacts in response to a circuit opening operation thereof, lockout spring means biased to separate said contacts and hold them separated to prevent automatic closing thereof, a toggle linkage connected to said lockout means comprising two overcenter pivots, releasable latch means cooperating with one of said overcenter pivots for holding the toggle associated therewith extended when said contacts are closed to hold said lockout spring against operation, stop means for holding the toggle associated with the other overcenter pivot at an extended position when said contacts are closed to hold said lockout spring against operation, operating means connected to one lever of the second mentioned toggle to move the lever overcenter in both directions for selectively opening and closing the contacts comprising power operating means to move said second pivot overcenter in a direction to close said contacts, and said power operating means being biased to move said second pivot means overcenter in the other direction with a force insufficient to do so when the contacts are closed but effective upon release of said latch means.

10. An automatic reclosing circuit interrupter comprising, separable contacts, means responsive to overloads in the circuit to separate said contacts, means for automatically closing said contacts in response to a circuit opening operation thereof, lockout spring means biased to separate said contacts and hold them separated to prevent automatic closing thereof, a toggle linkage connected to said lockout means comprising two overcenter pivots, releasable latch means cooperating with one of said overcenter pivots for holding the toggle associated therewith extended when said contacts are closed to hold said lockout spring against operation, stop means for holding the toggle associated with the other overcenter pivot at an extended position when said contacts are closed to hold said lockout spring against operation, operating means connected to one lever of the second mentioned toggle to move the lever overcenter in both directions for selectively opening and closing the contacts, and manual operating means mounted on a separate pivot and connected to the same toggle lever as said power operating means.

11. An automatic reclosing circuit interrupter comprising, separable contacts, means responsive to overloads in the circuit to separate said contacts, means for automatically closing said contacts in response to a circuit opening operation thereof, lockout spring means biased to separate said contacts and hold them separated to prevent automatic closing thereof, a toggle linkage connected to said lockout means comprising two overcenter pivots, releasable latch means cooperating with one of said overcenter pivots for holding the toggle associated therewith extended when said contacts are closed to hold said lockout spring against operation, stop means for holding the toggle associated with the other overcenter pivot at an extended position when said contacts are closed to hold said lockout spring against operation, operating means connected to one lever of the second mentioned toggle to move the lever overcenter in both directions for selectively opening and closing the contacts, and means for counting closely successive operations of said interrupter and being responsive to a predetermined number of such operations to move said one lever overcenter and permit said lockout means to open the contacts.

12. An automatic reclosing circuit interrupter comprising, separable contacts, means responsive to overloads in the circuit to separate said contacts, means for automatically closing said contacts in response to a circuit opening operation thereof, lockout spring means biased to separate said contacts and hold them separated to prevent automatic closing thereof, a toggle linkage connected to said lockout means comprising two overcenter pivots, releasable latch means cooperating with one of said overcenter pivots for holding the toggle associated therewith extended when said contacts are closed to hold said lockout spring against operation, stop means for holding the toggle associated with the other overcenter pivot at an extended position when said contacts are closed to hold said lockout spring against operation, operating means connected to one lever of the second mentioned toggle to move the lever overcenter in both directions for selectively opening and closing the contacts, comprising power operating means to move said second pivot overcenter in a direction to close said contacts, means for counting closely successive operations of said interrupter and being responsive to a predetermined number of such operations to move said one lever overcenter and permit said lockout means to open the contacts, and said counting means having a mechanical connection to said one lever.

13. An automatic reclosing circuit interrupter comprising, separable contacts, means responsive to overloads in the circuit to separate said contacts, means for automatically closing said contacts in response to a circuit opening operation thereof, lockout spring means biased to separate said contacts and hold them separated to prevent automatic closing thereof, a toggle linkage connected to said lockout means comprising two overcenter pivots, releasable latch means cooperating with one of said overcenter pivots for holding the toggle associated therewith extended when said contacts are closed to hold said lockout spring against operation, stop means for holding the toggle associated with the other overcenter pivot at an extended position when said contacts are closed to hold said lockout spring against operation, operating means connected to one lever of the second mentioned toggle to move the lever overcenter in both directions for selectively opening and closing the contacts, means for counting closely successive operations of said interrupter and being responsive to a predetermined number of such operations to move said one lever overcenter and permit said lockout means to open the contacts, and said counting means being engageable with said manual operating means.

References Cited in the file of this patent

UNITED STATES PATENTS

| | | |
|---|---|---|
| 917,542 | Cheney | Apr. 6, 1909 |
| 962,958 | Hewlett | June 28, 1910 |

| | | |
|---|---|---|
| 1,506,409 | Classen | Aug. 26, 1924 |
| 1,522,187 | Huber | Jan. 6, 1925 |
| 1,790,689 | Wood | Feb. 3, 1931 |
| 1,818,038 | Buker | Aug. 11, 1931 |
| 1,987,654 | Zawadzki | Jan. 15, 1935 |
| 2,145,140 | Starr | Jan. 24, 1939 |
| 2,145,141 | Starr | Jan. 24, 1939 |
| 2,246,298 | Dyer et al. | June 17, 1941 |
| 2,567,411 | Van Ryan | Sept. 11, 1951 |